United States Patent [19]

Anderson

[11] Patent Number: 5,170,569
[45] Date of Patent: Dec. 15, 1992

[54] DEVICE FOR MEASURING DIMENSIONS TO CALCULATE THE HEAD SPACE FOR GUNS

[76] Inventor: James R. Anderson, 1703 Maxwell, Ames, Iowa 50010

[21] Appl. No.: 801,424

[22] Filed: Dec. 2, 1991

[51] Int. Cl.$^5$ ............................................. G01B 3/22
[52] U.S. Cl. ................................... 33/506; 33/833; 33/794
[58] Field of Search ............... 33/833, 832, 506, 792, 33/794, 802; 42/1.07, 1.01; 86/24, 43

[56] References Cited

U.S. PATENT DOCUMENTS

| | | | |
|---|---|---|---|
| 2,483,089 | 9/1949 | Ferguson | 33/506 |
| 2,502,613 | 4/1950 | Zanolio | 33/506 |
| 2,544,158 | 3/1951 | Henderson | 33/506 |
| 2,553,704 | 5/1951 | Eckel | 33/506 |
| 3,217,417 | 11/1965 | Love et al. | |
| 3,780,438 | 12/1973 | Styczynski | 33/506 |
| 4,248,132 | 2/1981 | Blomseth | 33/506 |
| 4,577,412 | 3/1986 | McKinney | 33/833 |
| 4,608,762 | 9/1986 | Varner | 33/506 |
| 4,653,191 | 3/1987 | Gasser | 33/833 |
| 4,918,825 | 4/1990 | Lesh et al. | 33/506 |

OTHER PUBLICATIONS

Copy of pages from 1991, Brownells, Inc.—Catalog No. 44 front of catalog, 2nd page, and two page from catalog showing prior art.

Primary Examiner—Thomas B. Will
Attorney, Agent, or Firm—Henderson & Sturm

[57] ABSTRACT

An apparatus for measuring the distance between an outwardly extending planar surface on a head space gauge and a planar surface surrounding the head space gauge on the barrel of a gun. This distance is used to calculate the head space of a gun. A housing is provided for abutment with the planar surface on the barrel and has an opening for receiving a sleeve of a dial indicator. A set screw arrangement is provided for securely holding the sleeve of the dial indicator in a desired relationship for the measurement process.

2 Claims, 1 Drawing Sheet

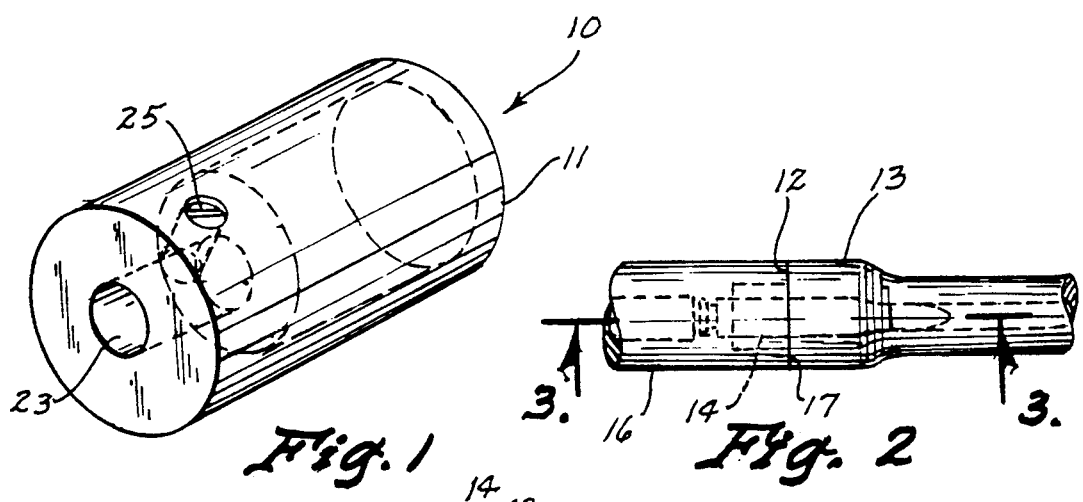
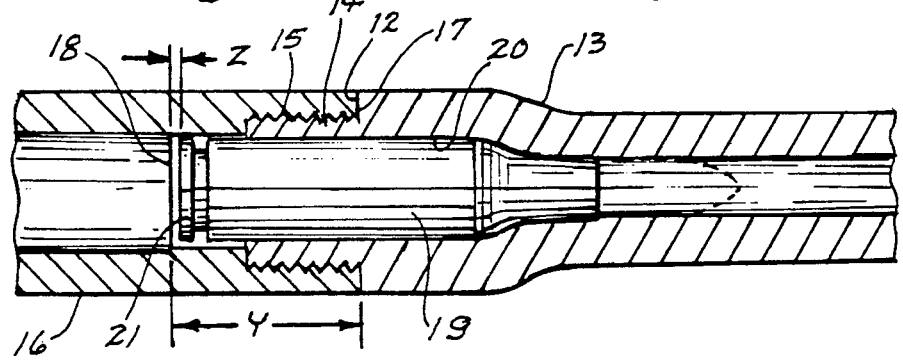
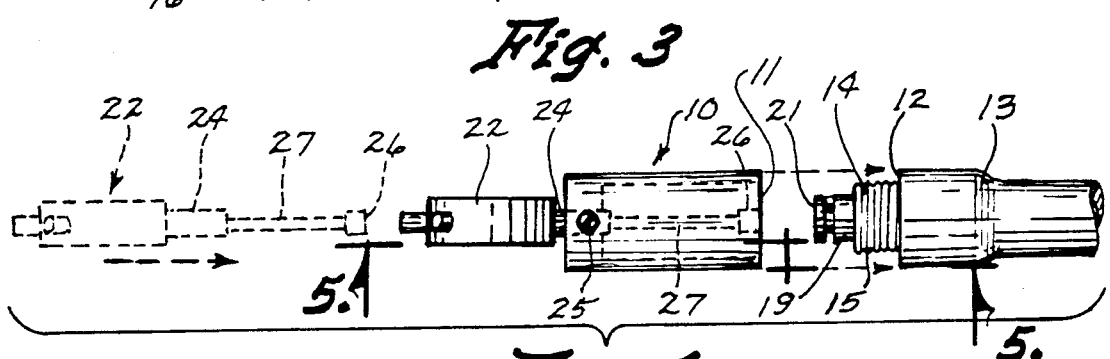
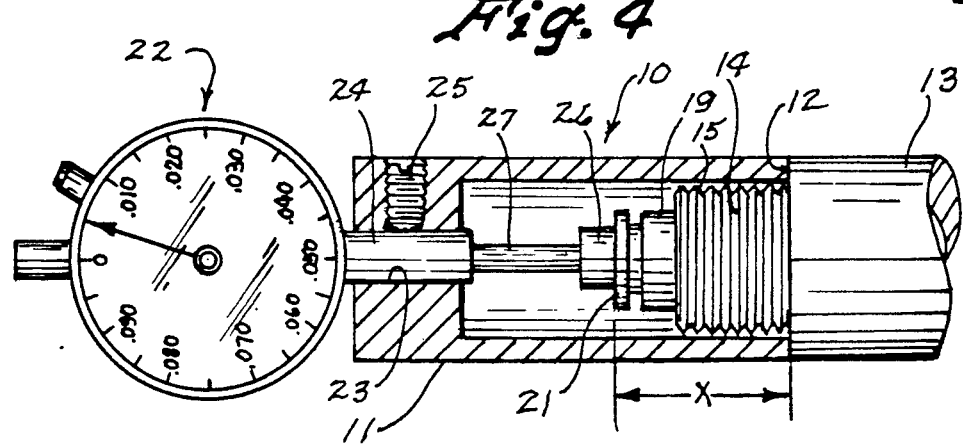

5,170,569

DEVICE FOR MEASURING DIMENSIONS TO CALCULATE THE HEAD SPACE FOR GUNS

TECHNICAL FIELD

The present invention relates generally to a device for use by gunsmiths, and more particularly to a device for measuring dimensions to calculate the head space for guns.

BACKGROUND ART

In guns, such as shotguns, rifles, pistols or the like, it is important to have the proper space between the breech face and the cartridge head. This space is referred to in the gunsmithing business as the "head space." It is the distance, in thousandths of an inch between the cartridge head and the breech face or bolt face. Since there is no convenient way to measure the head space directly, it has become a common practice to calculate it from two other dimensions.

The barrel of a gun is typically connected to the receiver of a gun by a threaded arrangement wherein the threaded male portion on the barrel is threadably received into a female threaded portion of the receiver. In this arrangement, a planar portion of the barrel abuts a planar portion of the receiver when the barrel is completely threaded into the receiver. By measuring the distance (y) between this planar abutting surface of the receiver from the breech face, such as by use of a depth micrometer, and then by making another measurement of the distance between the other abutting planar surface on the barrel and the distance that a shell or cartridge would extend out from the barrel when inserted into the chamber, the head space can be quickly calculated by subtracting these two distances. In practice, rather than measuring the distance between the planar surface on the barrel and the outwardmost extension of a live round placed in the firing chamber, a head space gauge, which has the shape of a shell or cartridge in the critical dimension to be measured, would be placed into the chamber and the distance (x) between the outwardmost planar surface thereon and the planar surface of the barrel would be measured, also with a depth micrometer, for example.

One of the problems, however, with using a depth micrometer is that it is difficult to hold the depth micrometer so that the axis of the measuring post extending therefrom is always kept completely parallel to the longitudinal axis of the head space gauge. If there is a substantial deviation from this desired parallel relationship during the measurement of dimension (x) referred to above, then the calculation of the head space will be wrong by the amount of this error.

Consequently, there is a need for a device which will more dependably measure the distance (x) referred to above, reducing the danger that it will be measured incorrectly.

DISCLOSURE OF THE INVENTION

The present invention relates generally to an apparatus for measuring the distance between an outwardly extending planar surface on a head space gauge and a planar surface surrounding the head space gauge on the barrel of a gun. A housing is provided for abutment with the planar surface on the barrel and has an opening for receiving a sleeve of a dial indicator. A set screw arrangement is provided for securely holding the sleeve of the dial indicator in a desired relationship for the measurement process.

Once the dial indicator is properly calibrated so that the bottom end of a reciprocating rod is at the same distance as the one end of the housing where it abuts with the planar surface of the barrel, then by placing this other end of the rod against the planar surface of the head space gauge and pushing the housing and dial indicator down to the position wherein the one end of the housing is in abutment with the planar surface of the barrel, the dial indicator will indicate the distance between the planar surface of the head space gauge and the planar surface of the barrel.

An object of the present invention is to provide an improved apparatus for measuring dimensions to calculate the head space for guns.

Another object of the present invention is to provide an apparatus for measuring the immediately above mentioned dimension, dependably and in a fool-proof manner.

Other objects, advantages, and novel features of the present invention will become apparent from the following detailed description of the invention when considered in conjunction with the accompanying drawings.

BRIEF DESCRIPTION OF THE DRAWINGS

FIG. 1 is a perspective view of the housing of the present invention prior to insertion of a dial indicator;

FIG. 2 is a partial top view of a portion of the barrel of a gun threadably engaged into the receiver portion of the gun and showing in dashed lines the chamber for receiving either a live round of ammunition or a head space gauge for measuring the position that a live round of ammunition would assume during operation of the gun;

FIG. 3 is a cross sectional view taken along line 3—3 of FIG. 2 and showing the position of the head space gauge with respect to the barrel, the receiver, the breech face and the chamber for receiving cartridges or the like;

FIG. 4 is an exploded view showing how a dial indicator is received in a housing and how the housing fits onto the barrel of the gun when the barrel is detached from the receiver of the gun; and FIG. 5 is a cross sectional view taken along line 5—5 of FIG. 4 showing the dial indicator secured into the housing and the housing being in abutment with the planar surface of the barrel whereby the dial indicator will measure the distance (x) shown in FIG. 5.

BEST MODE FOR CARRYING OUT THE INVENTION

Referring now to the drawings wherein like reference numerals designate identical or corresponding parts throughout the several views, FIG. 1 shows a housing (10) having one end (11) adapted to abut a planar surface (12) on barrel (13). The barrel (13) has a male threaded portion (14) adapted to threadably engage internal threads (15) on a receiver (16).

When the barrel (13) is attached to the receiver (16) by threadably engaging the threads (14) on the barrel with the threads (15) on the receiver, the planar surface (12) on the barrel (13) will abut the planar surface (17) on the receiver as is shown in FIG. 3. The distance between the planar surface (17) on the receiver (16) and the breech face (18) on the receiver is shown in FIG. 3 to be the distance (y), a distance which can be measured by a depth micrometer (not shown) or the like.

A head space gauge (19) is shown received in a chamber (20) of the barrel (13) in FIG. 3 and has a planar surface (21) on one end thereof which would correspond to the planar surface of a live cartridge or shell if it were in the chamber (20). The distance between the breech face (18) and the planar surface of the head space gauge (21) when the head space gauge (19) is fully inserted into the chamber (20) is the distance (z) as shown in FIG. 3. This head space distance (z) is of critical importance and, in order for the gun to operate properly, it must be maintained within critical tolerances.

In order to calculate the distance (z), it is also necessary to calculate the distance (x), shown in FIG. 5, which is the distance between the planar surface (21) of the head space gauge (19) and the planar surface (12) of the barrel (13). Because it is difficult to accurately measure this distance (x) with a depth micrometer or the like, the housing (10) is utilized. By inserting a dial indicator (22) into the housing (10) through opening (23), a sleeve (24) can be held in position by set screw (25). The lower end (26) of rod (27) of the dial indicator (22) is positioned so that it is in alignment with the bottom surface (11) of the housing (10) as shown in FIG. 4, prior to taking the measurement (x) shown in FIG. 5. This positioning can be accomplished by loosening the set screw (25), moving the sleeve (24) and dial indicator (22) until the surface (26) is in alignment with the surface (11), and then tightening the set screw (25) to the position shown in FIG. 4. In FIG. 4, the dial indicator will be at zero.

After the apparatus has been so adjusted, the surface (26) of the shaft (27) is placed on top of the planar surface (21) of head space gauge (19) as is shown in FIG. 5 and the housing (10) is then pushed against the planar surface (12) to the position shown in FIG. 5 whereupon the dial indicator (22) will indicate the distance (x).

Once the distance (x) has been measured, and the distance (y) has been measured, then the distance (z), or the head space, can be calculated by merely subtracting (x) from (y). The gunsmith can then make whatever adjustments are necessary to the gun to make sure that the head space (z) is within the proper tolerances so that the gun will operate properly.

Accordingly, it will be appreciated that the preferred embodiment shown herein does indeed accomplish the aforementioned objects. Obviously, many modifications and variations of the present invention are possible in light of the above teachings. It is therefore to be understood that, within the scope of the appended claims, the invention may be practiced otherwise than as specifically described.

I claim:

1. Apparatus for measuring dimensions to calculate the head space of a gun, said gun including a receiver and a barrel, said barrel having a first end and a second end, means for attaching said first end to said receiver, said attaching means including a threaded portion disposed about the longitudinal axis of said barrel and having a planar surface disposed about said threaded portion, said planar surface being perpendicular to said longitudinal axis, and chamber means for receiving a head space gauge, said apparatus comprising:

a head space gauge corresponding to critical dimensions of a live round of ammunition when disposed in said first end thereof, said head space gauge having one end which extends from said chamber means into said receiver and having another end disposed in said chamber means, said one end of said head space gauge having a planar surface thereon;

indicator means, including a rod having one end thereof disposed in a sleeve, said indicator means being for measuring the displacement of the other end of said rod from a first reference position corresponding to the planar surface on said barrel to positions displaced therefrom, said indicator means including a readout means for displaying said displacement;

housing means for holding said sleeve of said indicator means in a fixed relationship with respect to said barrel, said housing means having one end thereof adapted to be in abutment with said planar surface on said barrel;

means disposed on the other end of said housing means for receiving the sleeve of said indicator means; and means for selectively locking said sleeve to said housing means for holding said sleeve in a desired position with respect to said housing means and said other end of said rod in contact with the planar surface of said head space gauge, whereby when said other end of said rod is placed on said planar surface of said head space gauge and said housing means is pushed down against said planar surface of said barrel, said indicator means will indicate the distance between said two planar surfaces.

2. A method of using an apparatus of a type for measuring dimensions to calculate the head space of a gun, said gun including a receiver and a barrel, said barrel having a first end and a second end, means for attaching said first end to said receiver, said attaching means including a threaded portion disposed about the longitudinal axis of said barrel and having a planar surface disposed about said threaded portion which is perpendicular to said longitudinal axis, and chamber means for receiving a head space gauge corresponding to critical dimensions of a live round of ammunition when disposed in said first end thereof, said head space gauge having one end which extends from said chamber means into said receiver and another end disposed in said chamber means, said one end of said head space gauge having a planar surface thereon, said apparatus comprising:

indicator means, including a rod having one end thereof disposed in a sleeve, said indicator means being for measuring the displacement of the other end of said rod from a first reference position corresponding to the planar surface on said barrel to positions displaced therefrom, said indicator means including a readout means for displaying said displacement;

housing means for holding said sleeve of said indicator means in a fixed relationship with respect to said barrel, said housing means having one end thereof adapted to be in abutment with said planar surface on said barrel;

means disposed on the other end of said housing means for receiving the sleeve of said indicator means; and means for selectively locking said sleeve to said housing means for holding said sleeve in a desired position with respect to said housing means and said other end of said rod in contact with the planar surface of said head space gauge; said method comprising:

placing said other end of said rod onto the top of said head space gauge at a position corresponding to said planar surface thereof; and pushing on said housing until said housing means abuts said planar surface of said barrel, whereby said indicator means will indicate the distance between said planar surfaces.

* * * * *